June 9, 1959  O. K. KELLEY  2,889,717
AUTOMATIC PLURAL TRANSMISSIONS
Filed Dec. 7, 1956
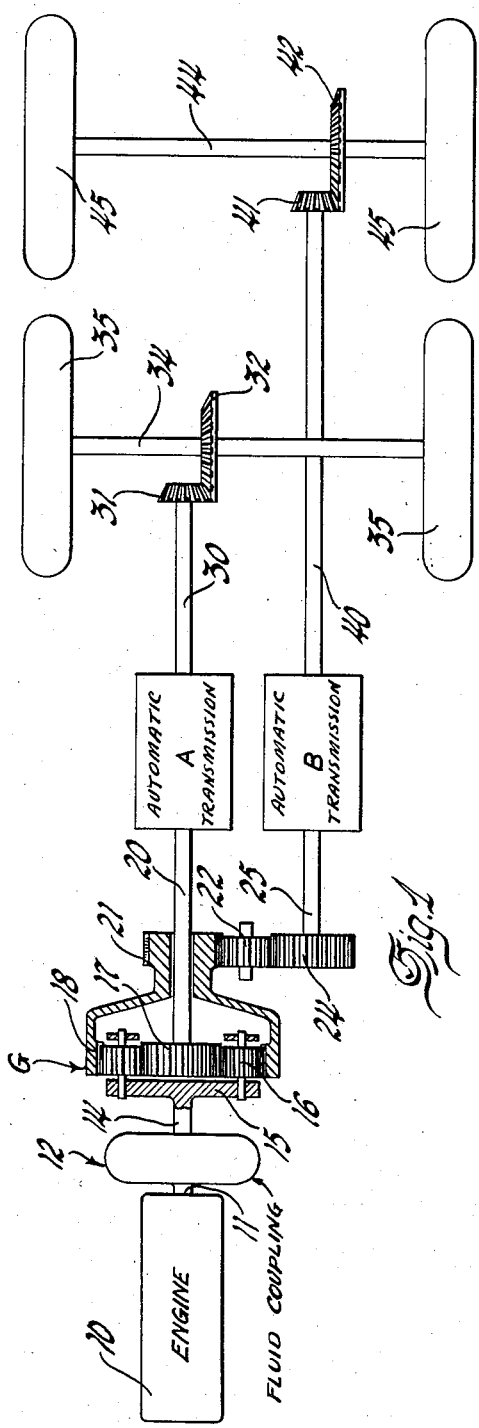
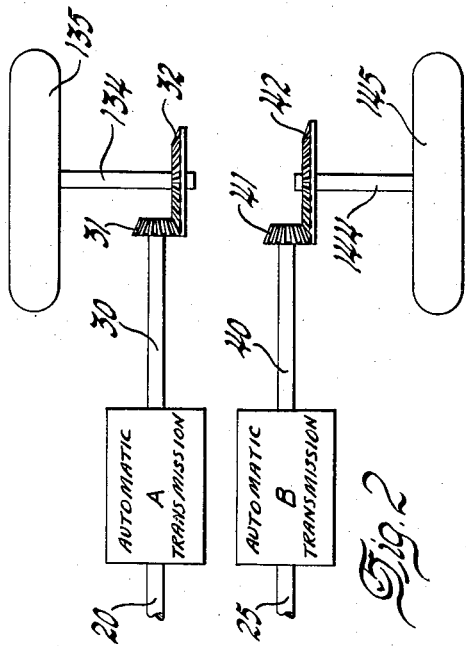
INVENTOR
Oliver K. Kelley
BY
T. L. Chisholm

United States Patent Office 2,889,717
Patented June 9, 1959

2,889,717
AUTOMATIC PLURAL TRANSMISSIONS
Oliver Kenneth Kelley, Bloomfield Hills, Mich.
Application December 7, 1956, Serial No. 627,543
9 Claims. (Cl. 74—710)

This invention relates to automatic plural transmissions and more particularly to such transmissions especially adapted for use in the drive of heavy duty vehicles.

This application is a continuation in part of my application Serial No. 441,138, filed July 2, 1954, now abandoned, for Automatic Plural Multi-Step Transmissions.

My copending application, S.N. 327,568, filed December 23, 1952, for Power Shifting Multi-Step Transmissions discloses transmissions which are particularly adaptable for use in heavy duty vehicles, both of the type known as road vehicles, and off-the-road vehicles. In the transmission of my aforesaid application a plurality of automatic multi-step ratio mechanisms are arranged in parallel with differential gearing interposed between the inputs of the mechanisms and a source of motive power, and with the outputs thereof effectively maintained in a predetermined relation. While the apparatus of my aforesaid application illustrates and describes principally arrangements wherein the output shafts are geared together, it was pointed out therein that a predetermined relation between the output shafts could be maintained in other ways, or in other words, different arrangements could be utilized for connecting the output shafts to load.

The invention is not limited to the use of automatic step ratio transmissions of the type disclosed in my aforesaid application but is equally applicable to other types of automatic transmissions with the only requirement being that the transmissions be capable of automatically varying the ratio between torque input and torque output under varying operating conditions. The term automatic transmission used herein is to be so construed.

An object of the present invention is to provide a transmission for a vehicle having a source of motive power and a plurality of traction members, which transmission comprises a plurality of automatic transmissions having their inputs differentially connected to the source of power and having their outputs connected to different traction members.

Another object of the invention is to provide a transmission wherein the automatic mechanisms have their output shafts connected to different traction members through gearing of different ratios whereby for the same speed of movement of the traction members different output shaft speeds will occur.

Another object of the invention is to provide a transmission wherein the individual driving or traction members of the vehicle are connected to individual automatic transmissions to be driven directly thereby, and wherein the transmissions are differentially driven from a single source of motive power whereby failure of, or reduced traction by, one traction member will not interfere with the tractive effort of another traction member.

A further object of the invention is to provide differential drive for the traction members of a vehicle through the agency of parallel arranged automatic transmissions, each connected directly to a different traction member and each having its input differentially driven relative to the input of another mechanism.

In carrying out the foregoing and other objects of the invention the drive system comprises a source of motive power such as an internal combustion engine, preferably a fluid coupling driven thereby and a planetary differential gear unit having one element thereof driven by the fluid coupling. The other two elements of the planetary gear unit are connected respectively to the input shafts of two automatic transmissions which may be of any well known type and which may be multi-step ratio transmission mechanisms. An idler gear can be interposed between one of the planetary elements and the input shaft of the mechanism driven by this element so that both inputs will be rotated in the same direction. The output shafts of the mechanisms are connected individually to traction members, either of single type or of plural type. For example, in one form of the invention the output of one mechanism can be connected directly to a traction wheel of a vehicle, and the output shaft of another mechanism can be connected to another traction wheel. In a further form of the invention the output shaft of one mechanism can be connected to an axle having a traction wheel at each end thereof while the output shaft of another mechanism is similarly connected to another axle of the same type. The connections between the output shafts and the axles may be such as to drive the traction wheels on the ends of an axle at the same speed, or the usual differential gear arrangement can be employed.

The operation and advantages of the present invention will become apparent by reference to the following detailed description of the accompanying drawing and the explanation relating thereto, such drawing comprising:

Fig. 1 which is a schematic diagram of one form of the invention, and

Fig. 2 which is a partial similar view of another form of the invention.

Referring to the drawing and particularly to Figure 1, 10 indicates a source of power such as an internal combustion engine. The output shaft 11 of this engine is connected to the pump of a fluid coupling indicated generally at 12, the turbine of which is connected to an output shaft 14. The pump and turbine have not been illustrated in detail since the construction of fluid couplings is well known. The output shaft 14 is connected to a carrier 15 on which are rotatably mounted a plurality of pinions 16 of a planetary gear unit G. The other elements of this gear unit comprise a sun gear 17 and a ring gear 18.

The sun gear 17 is secured to a transmission mechanism input shaft 20, which shaft constitutes the drive shaft of an automatic transmission mechanism A. The ring gear 18 is connected to a gear 21 which in turn is connected through an idler gear 22 to another gear 24 secured to shaft 25 which constitutes the drive shaft of a second automatic transmission mechanism B. These two mechanisms may be of any well-known type, one of which has been illustrated and described in detail in my aforesaid copending application, before identified.

The mechanism A has an output shaft 30 and a bevel gear 31 on the end thereof, which gear 31 meshes with a bevel gear 32 secured to an axle 34 having road wheels 35 on the ends thereof.

The mechanism B has an output shaft 40 which has a bevel gear 41 on the end thereof meshing with a bevel gear 42 secured to an axle 44 having road wheels 45 at the ends thereof.

It will be noted that the ratio between the gears 31—32 and 41—42 connecting the drive shafts 30 and 40 to their respective axles are different so that with the wheels 35 and 45 rotating at the same speed, the output shafts 30 and 40 must rotate at different speeds. The purpose of this will be explained later.

In Fig. 2 similar parts have been given the same reference characters as those applied in Fig. 1, and it will be seen that the mechanism A, having input shaft 20, has its output shaft 30 connected by bevel gears 31 and 32 to an axle 134 driving a single road wheel 135. Likewise the transmission mechanism B, having input shaft 25, has its output shaft 40 connected by bevel gears 41 and 42 to an axle 144 connected to a single road wheel 145. Again, the ratios employed in connecting the output shafts 30 and 40 to their respective axles is different so that with equal speed of rotation of the road wheels 135 and 145 different speeds of rotation of the output shafts must occur.

The operation of the invention in each of the two illustrated embodiments is substantially the same. Let it be assumed that the mechanism of Fig. 2 is employed in connection with a heavy duty off-the-road vehicle such as an earth mover, scraper, or the like, wherein the road wheels 135 and 145 are of relatively large size and of considerable weight. The inertia of each thereof will be fairly high. As disclosed in my aforesaid copending application, it is the purpose of the invention defined therein and also incorporated in this application to obtain a maximum number of gear ratios over a particular range of speed of the vehicle. To this end provision is made for changing gear ratios in the two mechanisms under normal conditions in staggered relation so that if each mechanism is capable of operation in four speed ratios, the two can be combined to obtain an overall range of seven ratios.

It follows therefore that with the output shafts geared to their respective driving axles through gearing of different ratios, the result will be that, so long as the speed of the wheels 135 and 145 is uniform, one drive shaft will always rotate at a predetermined greater speed than the other drive shaft, which is made possible by the differential gear unit employed to connect the source of motive power to the inputs of the two mechanisms A and B. This relation will exist as long as the road wheels 135 and 145 meet with equal resistance to rotation. In other words, the two output shafts 30 and 40 are in effect geared together through the road wheels and the terrain over which they travel.

As long as this relation exists and the wheels meet with equal resistance to traction, the two transmissions can automatically shift alternately from the lowest speed ratio in which both mechanisms operate in first speed ratio to the highest overall ratio in which both mechanisms operate in fourth speed ratio. The gearing between the output shafts of the two mechanisms and the road wheel shafts 134 and 144 is so determined as to cause the automatic shifts to occur at substantially equally spaced intervals along the range of output shaft speed during which shift occurs.

It is to be understood that the torque from the engine is divided between the two mechanisms A and B in any desired ratio, preferably evenly divided, which can be obtained by proper choice of gear dimensions in the planetary gear unit G and its associated gearing. Since the output of the engine serves to drive the carrier of the planetary unit, it follows that each mechanism A and B and the parts driven thereby must afford mutual reaction for successful transmission of torque through the mechanisms to the road traction members. The division of torque between the two mechanisms continues even through one mechanism may be operating in a higher speed ratio than the other.

Due to this arrangement, whatever engine torque is delivered to one mechanism for transmission to its driven traction member is also delivered to the other mechanism for transmission to its traction member. This is of particular advantage in the obtaining of vehicle drive even though the traction member driven by one transmission may be slipping due to mud, sand or ice and is losing traction. Referring again to Fig. 2, let it be assumed that each mechanism A and B has a first or low speed ratio in the order of 1:3, and further assumed that the vehicle is at rest with the traction wheel 145 in contact with a surface affording negligible traction. In the endeavor to start the vehicle, both mechanisms A and B will be in first speed ratio, and when engine torque is supplied to the inputs of each thereof, wheel 145 driven by mechanism B can spin without delivering traction. However, a certain amount of engine torque is required to spin the wheel without traction, and such torque in equal amount will be supplied to mechanism A. For example, let it be assumed that an engine torque of 100 lb. ft. supplied to mechanism B is required to spin the wheel 145. An equal engine torque will be supplied to mechanism A, and due to the gear ratio thereof such torque will be multiplied, in this instance by three. Thus it will be obvious that under these conditions a torque of 300 lb. ft. will be applied to the axle 134, driving the traction member 135. This may be sufficient to initiate movement of the vehicle if the traction wheel 135 is in contact with a surface affording good traction.

It is possible under the conditions just assumed that the application of engine torque to the mechanism B to spin wheel 145 will eventually cause rotation of this wheel at such a speed as to cause mechanism B to shift to second speed ratio, third speed ratio, or even fourth speed ratio. Such upshift may reduce the engine torque applied to mechanism B since it is obvious that less torque is required to maintain spinning of wheel 145 than is required to initiate such spinning. However, this lesser amount of engine torque will also still be supplied to transmission A and can be multiplied therein in accordance with the speed ratio condition in that mechanism for delivery to the traction member 135. It is possible that mechanism A will operate in first speed ratio with its maximum torque multiplication for a considerable period, but even if it attains a drive speed of wheel 135 sufficient to cause an upshift in mechanism A, the torque multiplication therein will continue at a reduced ratio until mechanism A is in direct drive.

It will be evident that this invention, as just explained, is of particular advantage for use in heavy duty vehicles such as off-the-road tractors, scrapers, and the like, wherein individual drive of the main driving or traction elements is desirable. In such a vehicle it is entirely possible that the engine torque required to spin one of the traction members may be of the order of 1000 lb. ft. An equal engine torque will be delivered to the mechanism connected to the other driving member and will be multiplied to an order of, for example, 3000 lb. ft. Such torque under ordinary conditions will be sufficient to propel the vehicle by one traction member even if the other traction member loses traction completely.

It is to be understood that the foregoing principle of operation applies equally to automatic transmissions of types other than step ratio transmissions. The result will be the same whether the change in torque ratio is accomplished in steps or in any other manner, since with the traction members offering reaction one for the other in any type of automatic transmission multiplied torque will be delivered to one traction member when the other traction member may be slipping.

From the foregoing it will be seen that the present invention provides a differential drive for traction members, with the added advantage that under conditions which may be expected in normal use of the vehicle, the transmission of multiplied engine torque to one of the driven members will continue even though the engine torque to the other driven member may not be sufficient to afford vehicle drive.

The operation of the embodiment of Fig. 1 is the same as that described in connection with Fig. 2, with the sole difference that each mechanism drives two traction members instead of a single traction member. Thus, if one or both of the traction members driven by one mechanism tend to slip or lose tractive effort for the reasons previously mentioned, torque is still transmitted to the other pair of traction members, or at least to one thereof. It will be noted that in Fig. 1 the two axles 34 and 44 are shown as being geared directly to their respective mechanism output shafts for simultaneous drive of each wheel associated with the respective axles. However, it will be obvious that instead of the direct drive to each axle, use may be made of a conventional differential drive thereto, such as a differential drive between, for example, the output shaft 30 and separate axles driving the respective wheels 35.

The operation of the invention has been described hereinbefore in connection with arrangements wherein the wheel axles are connected to the respective output shafts by gearing of different ratios. If desired, the same ratio of gearing may be used and the desired results obtained, as described in my aforesaid copending application, wherein it has been pointed out that the control devices causing ratio change in the two mechanisms can be calibrated in such fashion that the mechanisms will shift alternately in the desired pattern. A further expedient is the provision of different weights in the hydraulic governors of the two mechanisms for the same purpose.

The term traction member used herein includes not only wheels, as illustrated, but also the tracks utilized in track-laying vehicles such as tanks, and the like.

It is evident from the foregoing that the present invention provides novel transmissions wherein torque for driving purposes can be supplied, even under adverse conditions. The invention is not to be limited to the illustrated embodiment, but is to be limited only by the scope of the following claims.

What is claimed is:

1. In a vehicle having a source of motive power and a plurality of traction members, means for providing a differential drive between said source of motive power and said traction members comprising a differential gear unit having an input member driven by said source of motive power, and having output members, each output member being connected to and driving a separate automatic plural step-ratio change mechanism, each of said mechanisms being connected individually to its own traction member, the drive ratios of said mechanisms being automatically changeable independently one of another.

2. A transmission for a vehicle having a source of motive power and having a plurality of traction members, said transmission comprising a plurality of automatic plural step-ratio change mechanisms having input shafts and output shafts, the output shaft of one of said mechanisms being connected to drive one of said traction members, the output shaft of another of said mechanisms being connected to drive another of said traction members, the connections between the output shafts and the traction members being such that when said traction members are rotated at the same speed the output shaft of one mechanism rotates faster than the output shaft of another mechanism, and differential gearing connecting the input shafts of said mechanisms to said source of motive power to cause differential driving of said mechanisms by said source of motive power, the relation between the speeds of said output shafts being such that under equal conditions of resistance to traction encountered by said traction members automatic change of ratio in one mechanism is staggered relative to automatic change of ratio in another mechanism.

3. A transmission for a vehicle having a source of motive power and having a plurality of traction members, said transmission comprising a plurality of automatic plural step-ratio change mechanisms having input shafts and output shafts, the output shaft of one of said mechanisms being connected to drive one of said traction members, the output shaft of another of said mechanisms being connected to drive another of said traction members, the connections between the output shafts and the traction members being such that when said traction members are rotated at the same speed the output shaft of one mechanism rotates faster than the output shaft of another mechanism, and differential gearing connecting the input shafts of said mechanisms to said source of motive power to cause differential driving of said mechanisms by said source of motive power, the relation between the speeds of said output shafts being such that under equal conditions of resistance to traction encountered by said traction members automatic change of ratio in one mechanism is staggered relative to automatic change of ratio in another mechanism, and under unequal conditions of resistance to traction encountered by said traction members automatic change of ratio in one mechanism is completely independent of automatic change of ratio in another mechanism.

4. Torque transmitting mechanism for a vehicle having a source of motive power and having a plurality of traction members, said mechanism comprising a plurality of automatic variable torque ratio transmissions having input shafts and output shafts, said output shafts being individually connected to different traction members in predetermined output shaft speed relation, and means for connecting the input shafts of said transmissions to said source of motive power to be differentially driven thereby in a predetermined torque relation.

5. Torque transmitting mechanism for a vehicle having a source of motive power and having a plurality of traction members, said mechanism comprising a plurality of automatic plural step-ratio transmissions having input shafts and output shafts, said output shafts being individually connected to different traction members in predetermined output shaft speed relation, and means for connecting the input shafts of said transmissions to said source of motive power to be differentially driven thereby in a predetermined torque relation.

6. Torque transmitting mechanism for a vehicle having a source of motive power and having a plurality of traction members, said mechanism comprising a plurality of automatic transmissions having input shafts and output shafts, said output shafts being individually connected each to a different traction member with different gear ratios between the output shafts and the traction members, and means for connecting the input shafts of said transmissions to said source of motive power to be differentially driven thereby in a predetermined torque relation.

7. Torque transmitting mechanism for a vehicle having a source of motive power and having a plurality of traction members, said mechanism comprising a plurality of automatic plural step-ratio transmissions having input shafts and output shafts, said output shafts being individually connected each to a different traction member with different gear ratios between the output shafts and the traction members, and means for connecting the input shafts of said transmissions to said source of motive power to be differentially driven thereby in a predetermined torque relation.

8. In a motor vehicle in combination two independently drivable traction members for propelling the vehicle, an engine and a pair of automatic variable torque ratio transmitting mechanisms whose inputs are differentially driven by the engine, the output of each of the mechanisms being connected to drive separate traction members, each one of the mechanisms being adapted to decrease its torque ratio automatically in response to decrease of resistance to movement of the traction member connected to said one mechanism.

9. In a motor vehicle in combination two independently drivable traction members for propelling the vehicle, an engine, and a pair of automatic variable ratio torque transmitting mechanisms, the output of each of the mechanisms being connected to drive separate traction members, means for connecting the inputs of said mechanisms to said engine to be differentially driven thereby in a predetermined torque relation whereby slipping of the traction member connected to one of said mechanisms causes increase of the torque ratio of the other of said mechanisms.

References Cited in the file of this patent
UNITED STATES PATENTS 2,441,703    Irwin _____ May 18, 1948